United States Patent [19]

Redding

[11] Patent Number: 5,086,580
[45] Date of Patent: Feb. 11, 1992

[54] FISH JIGGING APPARATUS

[76] Inventor: Ronald M. Redding, 555 Pacific St., Coalinga, Calif. 93210

[21] Appl. No.: 640,614

[22] Filed: Jan. 14, 1991

[51] Int. Cl.$^5$ .................... A01K 97/10; A01K 87/00
[52] U.S. Cl. ................................ 43/21.2; 43/19.2
[58] Field of Search ...................... 43/19.2, 26.1, 21.2

[56] References Cited

U.S. PATENT DOCUMENTS

| | | | |
|---|---|---|---|
| 2,513,475 | 7/1950 | Grevich | 43/21.2 |
| 3,126,180 | 3/1964 | Mandolare | 43/21.2 |
| 3,623,259 | 11/1971 | Rode | 43/19.2 |
| 3,665,633 | 5/1972 | Scott | 43/19.2 |
| 4,120,112 | 10/1978 | McBain | 43/26.1 |
| 4,581,840 | 4/1986 | Guith | 43/21.2 |
| 4,603,499 | 8/1986 | Simborski | 43/21.2 |
| 4,660,317 | 4/1987 | Evans | 43/26.1 |
| 4,951,411 | 8/1990 | Ecker | 43/26.1 |

Primary Examiner—Kurt Rowan
Attorney, Agent, or Firm—Leon Gilden

[57] ABSTRACT

An apparatus wherein a fishing pole holder is horizontally mounted relative to a housing, with the housing mounted to an underlying boat structure. A handle is directed from interiorly of the housing extending exteriorly thereof and arranged for rotation relative to the housing, with the handle defining an arc of rotation concentric from an arcuate rear face of the housing to define clearance for the handle in use. The handle is mounted for oscillation of a sprocket interiorly of the housing, wherein the sprocket effects oscillation of a further sprocket to effect oscillation of a fishing pole holder structure mounted through a top surface of the housing.

4 Claims, 6 Drawing Sheets

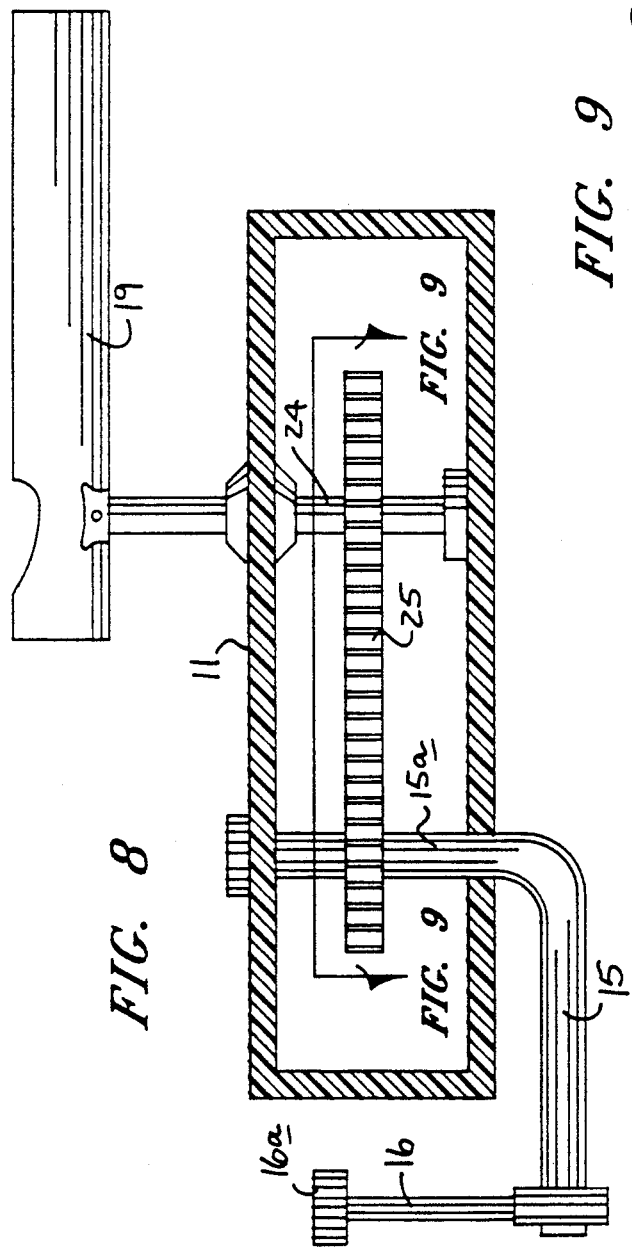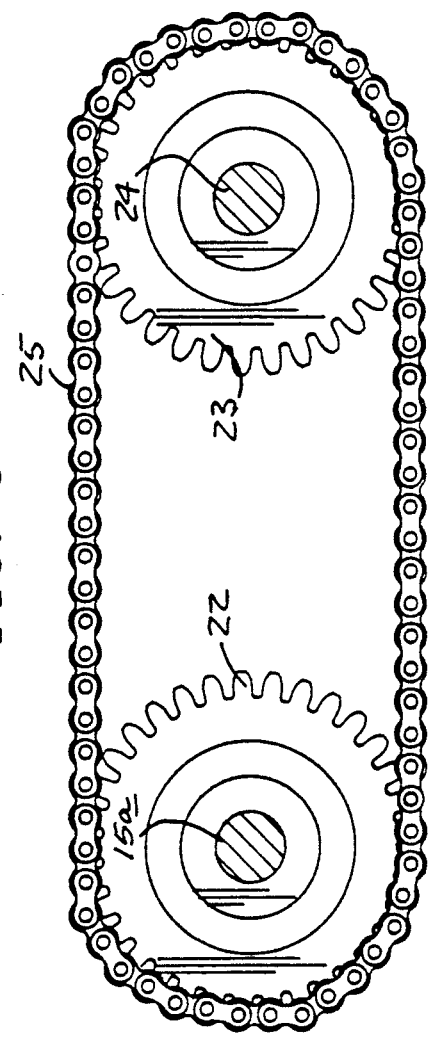

FISH JIGGING APPARATUS

BACKGROUND OF THE INVENTION

1. Field of the Invention

The field of invention relates to fishing apparatus, and more particularly pertains to a new and improved fish jigging apparatus wherein the same permits oscillation of a fishing pole relative to a support housing in use.

2. Description of the Prior Art

In various fishing events to impart simulation of realistic movement of a bait or lure at the end of a fishing line, a jiggling or oscillation of the line, either in a horizontal or vertical orientation relative to a water surface, enhances success in a fishing scenario. Further, when fishing from a boat, to enhance a jigging motion, fisherman have a tendency to stand in the boat with an associated discomfort and safety hazard. The instant invention attempts to overcome deficiencies by setting forth an organization permitting a fisherman to remain seated and impart a regular oscillation to a fishing pole and associated fishing line and bait in a convenient and comfortable manner. Prior art structure may be found in U.S. Pat. No. 2,783,576 to Filut setting forth a lounging arrangement wherein the same effects vertical positioning and reciprocation of the line at predetermined intervals.

U.S. Pat. No. 2,861,378 to Bell sets forth a fish line deflector arranged for deflecting and repositioning of fishing line at regular cycles.

U.S. Pat. No. 4,251,939 to Tiede sets forth a fish line jigger wherein the fishing pole is positioned upon rotating of a cam-like surface to effect reciprocation of the fishing line within fishing waters.

U.S. Pat. No. 4,280,295 to Hoeving, et al. sets forth a fish line jigging arrangement utilizing an oscillating plate to effect reciprocating motion of the line.

U.S. Pat. No. 4,081,922 to Johnson sets forth a fishing line jigger utilizing a plurality of fishing lines mounted relative to opposed support standards.

As such, it may be appreciated that there continues to be a need for a new and improved fish jigging apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fish jigging apparatus now present in the prior art, the present invention provides a fish jigging apparatus wherein the same permits manual and selective oscillation of a fishing pole and associated reciprocation of a fishing line within fishing waters as desired and metered by an individual fisherman. As such, the general purpose of the present invention, which will be described subsequently in greater detail, is to provide a new and improved fish jigging apparatus which has all the advantages of the prior art fish jigging apparatus and none of the disadvantages.

To attain this, the present invention provides an apparatus wherein a fishing pole holder is horizontally mounted relative to a housing, with the housing mounted to an underlying boat structure. A handle is directed from interiorly of the housing extending exteriorly thereof and arranged for rotation relative to the housing, with the handle defining an arc of rotation concentric from an arcuate rear face of the housing to define clearance for the handle in use. The handle is mounted for oscillation of a sprocket interiorly of the housing, wherein the sprocket effects oscillation of a further sprocket to effect oscillation of a fishing pole holder structure mounted through a top surface of the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish jigging apparatus which has all the advantages of the prior art fish jigging apparatus and none of the disadvantages.

It is another object of the present invention to provide a new and improved fish jigging apparatus which may be easily and efficiently manufactured and marketed.

It is a further object of the present invention to provide a new and improved fish jigging apparatus which is of a durable and reliable construction.

An even further object of the present invention is to provide a new and improved fish jigging apparatus which is susceptible of a low cost of manufacture with regard to both materials and labor, and which accordingly is then susceptible of low prices of sale to the consuming public, thereby making such fish jigging apparatus economically available to the buying public.

Still yet another object of the present invention is to provide a new and improved fish jigging apparatus which provides in the apparatuses and methods of the prior art some of the advantages thereof, while simultaneously overcoming some of the disadvantages normally associated therewith.

Still another object of the present invention is to provide a new and improved fish jigging apparatus wherein the same permits selective manual jigging of a fishing pole mounted to an associated boat structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a cross-sectional view of the housing and drive mechanism utilized by the instant invention.

FIG. 9 is an orthographic view, taken along the lines 9—9 of FIG. 8 in the direction indicated by the arrows.

DESCRIPTION OF THE PREFERRED EMBODIMENT

Figure 1:
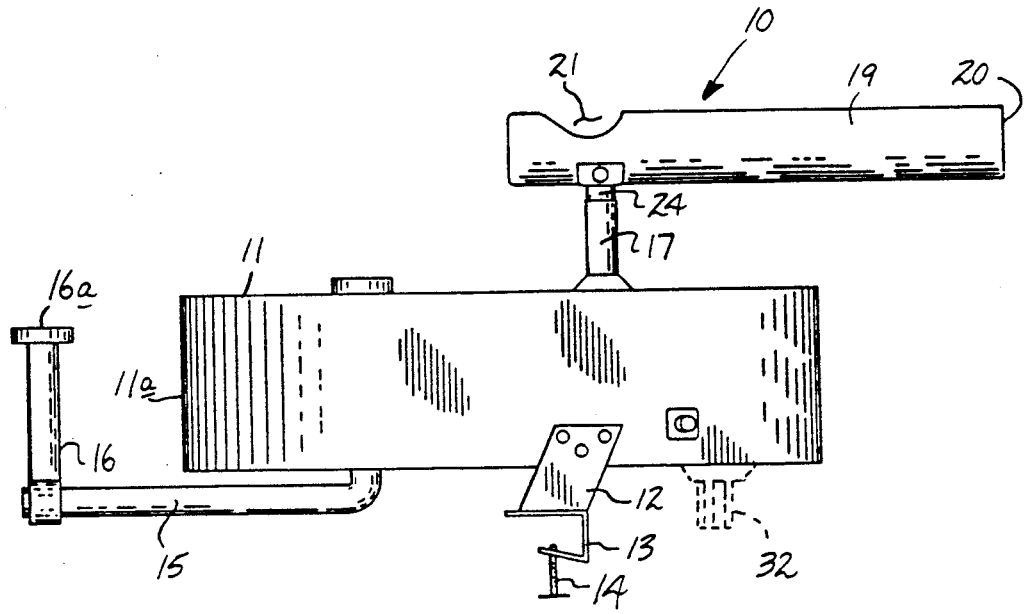
FIG. 1 is an orthographic right side view of the instant invention.
Figure 2:
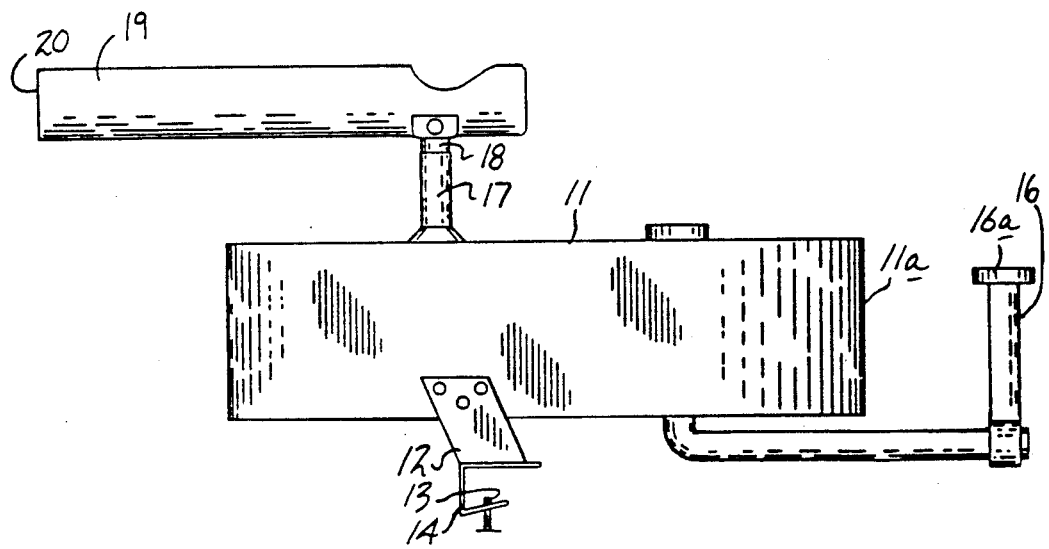
FIG. 2 is an orthographic left side view of the instant invention.
Figure 3:
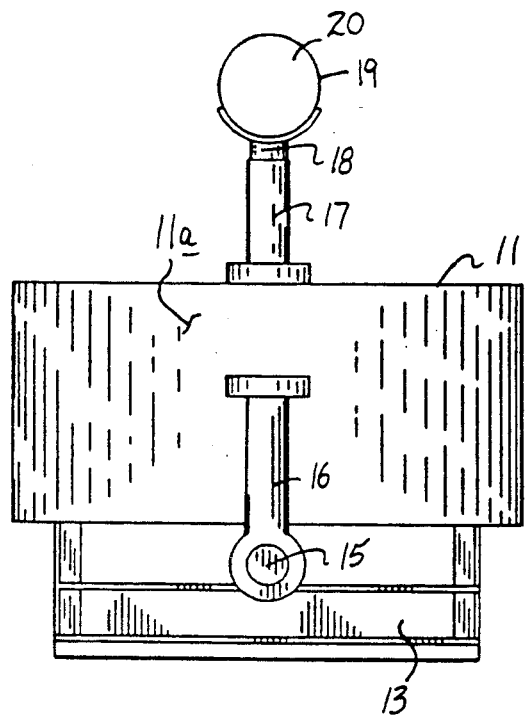
FIG. 3 is an orthographic frontal view, taken in elevation, of the instant invention.
Figure 4:
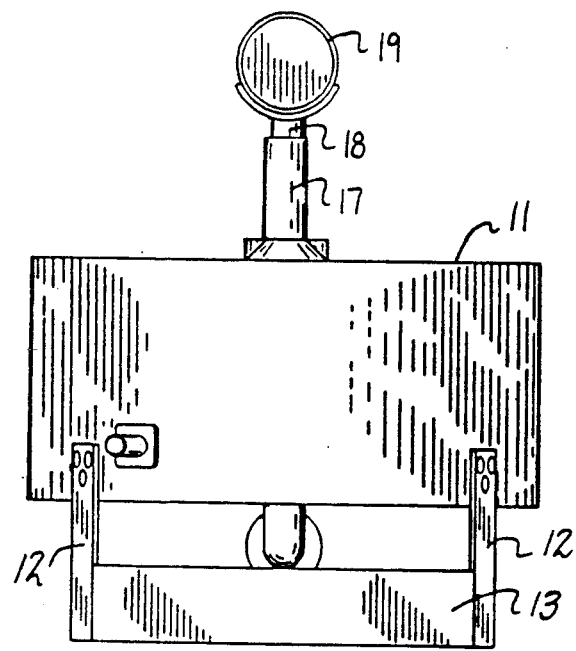
FIG. 4 is an orthographic rear view, taken in elevation, of the instant invention.
Figure 5:
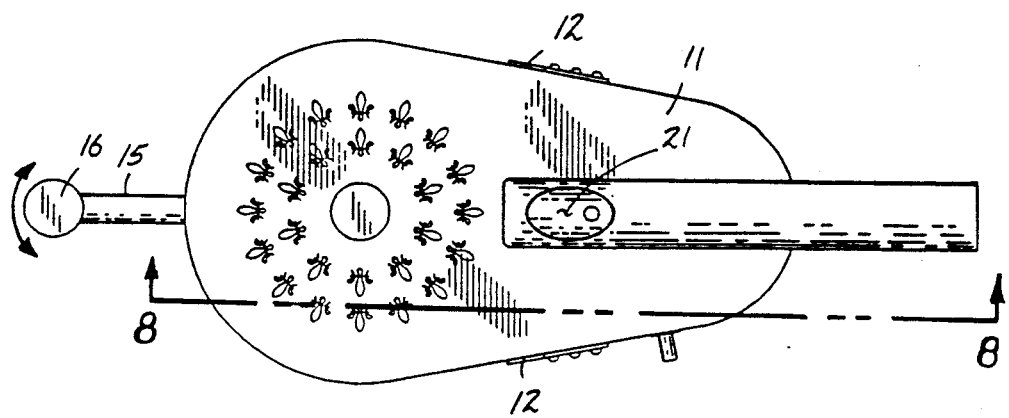
FIG. 5 is an orthographic top view of the instant invention.
Figure 6:
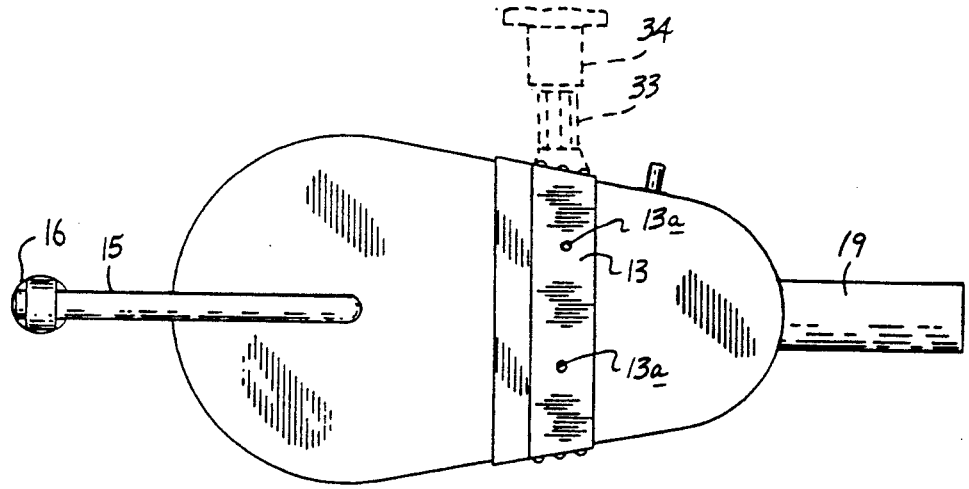
FIG. 6 is an orthographic bottom view of the instant invention.

With reference now to the drawings, and in particular to FIGS. 1 to 11 thereof, a new and improved fish jigging apparatus embodying the principles and concepts of the present invention and generally designed by the reference numeral 10 will be described.

More specifically, the fish jigging apparatus 10 of the instant invention essentially comprises an elongate housing 11 defining a top surface spaced from and parallel a bottom surface, including a rear arcuate surface 11a defined by a predetermined first arc. Spaced mounting plates 12 mounted to opposed side walls of the housing 11 and mount a "U" shaped mounting bracket 13 coextensively therebetween, with the "U" shaped mounting bracket extending rearwardly of and arranged parallel relative to the bottom wall of the housing, including a plurality of threaded bores 13a (see FIG. 6 for example), including threaded clamp rods 14 directed through the respective bores to engage boat structure "B" (see FIG. 7) within the "U" shaped bracket 13.

An "L" shaped handle leg 15 extending from interiorly of the housing 11 extends rearwardly of the housing and parallel to the bottom wall of the housing, and including a vertical handle leg 16 orthogonally mounted to a rear terminal end of the handle leg 15, with an abutment plate 16a orthogonally mounted to an upper terminal end of the vertical handle leg 16. The vertical handle leg 16 is arranged for rotation about a housing handle leg interior leg member 15a (see FIG. 8) defining a second arc in oscillation of the vertical handle leg 16 relative to the housing rear wall surface 11a. The second arc and first arc are of predetermined spacing defined by concentric circles to maintain the predetermined spacing during oscillation of the vertical handle leg 16 relative to the housing rear wall surface 11a and provide clearance for grasping and manipulation of the vertical handle leg 16. A support sleeve 17 is orthogonally mounted to the top wall of the housing 11 and rotatably aligns a second sprocket support shaft 24 therethrough that is orthogonally mounted relative to the top and bottom walls of the housing 11 and extends upwardly beyond the top wall of the housing, in a manner as illustrated in FIG. 8 for example. The second sprocket support shaft 24 is arranged parallel to the housing handle leg interior leg member 15a. A fishing pole support tube 19 is fixedly and orthogonally mounted to an upper terminal end of the second sprocket support shaft 24 and includes a forward open end 20 to direct a fishing pole "P" therethrough (see FIG. 11) and includes a reel opening 21 directed through the tubular side wall of the support tube 19 adjacent a rear end of the tube 19.

Reference to FIG. 8 illustrates that the housing handle leg interior leg member 15a mounts a first sprocket 22, with a second sprocket 23 mounted coplanar with the first sprocket 22 concentrically and fixedly about the second sprocket support shaft 24. An endless drive chain 25 is surroundingly and engagedly mounted between the first and second sprockets 22 and 23 respectively. As illustrated, the sprockets are in essentially a one-to-one ratio, but it is understood that ratios from one-to-one to four-to-one are contemplated to effect selective adjustment of relative oscillation required of the vertical handle leg 16 to effect ultimate oscillation of the support tube 19 and the associated fishing pole "P".

Figure 10:
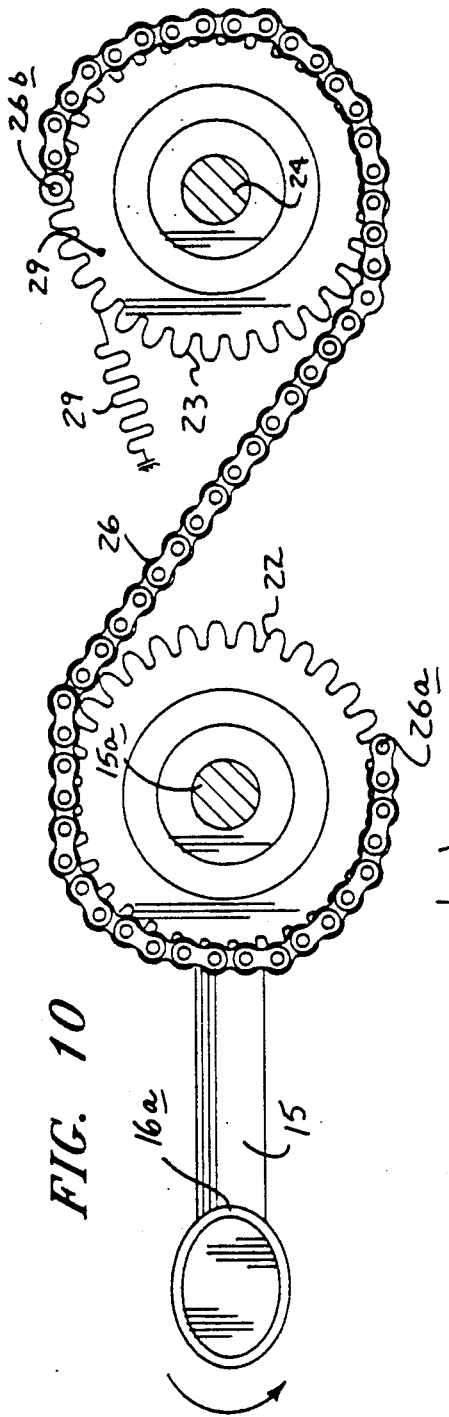
FIG. 10 is an orthographic top view of the drive gears in a modified configuration utilized by the instant invention.

FIG. 10 illustrates the use of a modified drive chain 26, wherein a first end 26a is fixedly mounted to the first sprocket 22 and wound thereabout in a clockwise manner, with the modified drive chain 26 defined by a finite length, as opposed to the endless drive chain 25, including a second end 26b wound about the second sprocket 23 in a counter-clockwise manner, with the second end 26b affixed thereto. A return spring 29 is mounted to a return spring mount 29a in a spaced relationship relative to the second end 26b to effect a snap-back return of the sprockets minimizing required effort and oscillation of the handle 16 in use.

Figure 7:
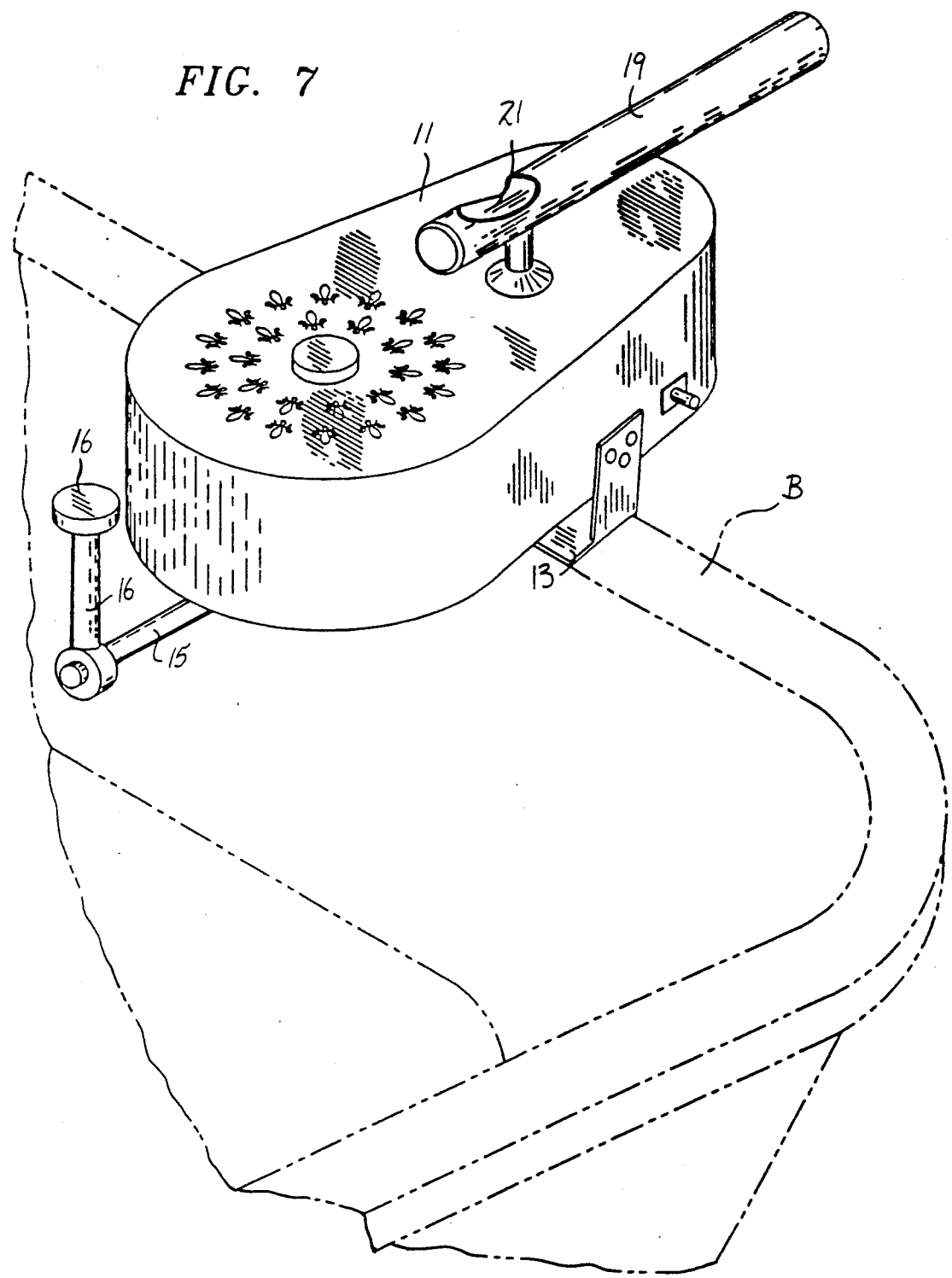
FIG. 7 is an isometric illustration of the instant invention.
Figure 11:
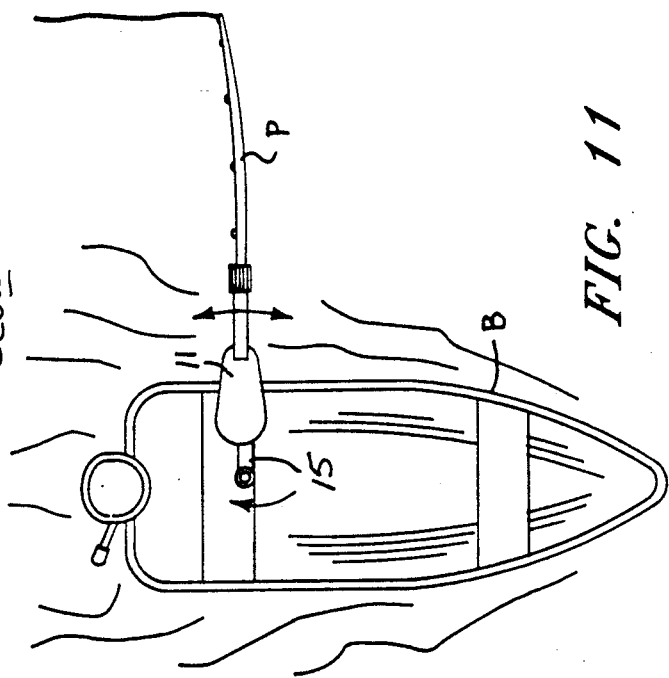
FIG. 11 is an orthographic top view of the instant invention in use association with a fishing boat.

It should be noted that in use that the "L" shaped handle leg 15 may be telescopingly arranged to permit selective spacing of the vertical handle leg 16 relative to the housing arcuate rear wall surface 11a. Further, it should be noted that in reference to FIGS. 1 and 6, a spline shaft 32 is fixedly mounted to the bottom wall of the housing 11 and a further spline shaft 33 is fixedly mounted to at least one side wall of the housing 11, wherein the further spline shaft 33 is arranged orthogonally relative to the spline shaft 32. The spline shafts 32 and 33 are selectively arranged for reception with an internally threaded spline cup 34 that in turn is arranged for fixed mounting to a boat structure, such as of a type as illustrated in FIGS. 7 and 11. The orthogonally arranged spline shafts permit a selective horizontal or vertical mounting of the housing 11 to selectively permit the fishing pole that is contained within the support tube 19 to be oscillated generally horizontally or orthogonally relative to an associated water surface in a jigging procedure.

As to the manner of usage and operation of the instant invention, the same should be apparent from the above disclosure, and accordingly no further discussion relative to the manner of usage and operation of the instant invention shall be required.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish jigging apparatus in combination with a boat, with the apparatus mounted to a side wall of the boat, wherein the apparatus comprises,
    a housing, the housing including a housing top wall spaced from and parallel a housing bottom wall, and including an arcuate housing rear wall defining a first arc, and
    the housing mounted overlying the boat side wall, and
    an "L" shaped housing handle leg, including a handle leg interior leg member orthogonally and rotatably mounted between the top and bottom wall of the housing, and
    a horizontal leg member of the "L" shaped handle leg extending rearwardly of the housing arranged generally parallel to the bottom wall of the housing and extending beyond the housing arcuate rear wall, and
    a vertical handle leg orthogonally mounted to a rear terminal end of the horizontal leg member, with the vertical handle leg arranged for oscillation relative to the housing arcuate rear wall defining a second arc, wherein the second arc and first arc are spaced apart a predetermined spacing and defined by respective first and second concentric circles, and
    a fishing pole support tube mounted above the housing top wall and extending forwardly of the housing, and drive means mounted within the housing for oscillation of the fishing pole support tube upon oscillation of the vertical handle leg.

2. An apparatus as set forth in claim 1 wherein the drive means includes a first sprocket coaxially mounted about the horizontal handle leg interior leg member, and a second sprocket coaxially and integrally mounted to a second sprocket support shaft, with the second sprocket support shaft orthogonally mounted between the top and bottom walls and arranged parallel to the housing handle leg interior leg member, with the first and second sprocket arranged coplanar relative to one another, and a drive chain mounted between the first and second sprockets.

3. An apparatus as set forth in claim 2 wherein the fishing pole support tube includes a forward open end directing a fishing pole therethrough, and a reel opening directed through the support tube adjacent a rear terminal end of the support tube.

4. An apparatus as set forth in claim 2 wherein the drive chain includes a drive chain defined by a finite length, and a first end mounted to the first sprocket and wound clockwise about the first sprocket extending to the second sprocket and wound counter-clockwise about the second sprocket, and a return spring mounted to the second sprocket spaced from the second end, with the second end mounted to the second sprocket and the first end mounted to the first sprocket, and the return spring mounted to the support housing to normally bias the second sprocket in the first position from a second position upon rotation of the vertical handle leg relative to the housing.

* * * * *